United States Patent Office 3,576,034
Patented Apr. 20, 1971

3,576,034
ORGANOSILICON COMPOUNDS
Christopher A. Pearce, Cowbridge, Glamorgan, Wales, assignor to Midland Silicones Limited, Reading, England
No Drawing. Filed May 21, 1969, Ser. No. 826,731
Claims priority, application Great Britain, May 29, 1968, 25,833/68
Int. Cl. C07f 7/06, 7/18
U.S. Cl. 260—448.8
4 Claims

ABSTRACT OF THE DISCLOSURE

Silanes of the formula $XC_6H_4OSiHR'_2$ where X is Cl or Br and R' is a monovalent hydrocarbon radical prepared by reacting a halogenated phenol ($XC_6H_4OH$) with an organosilicon compound having an $R'_2HSi$— group present. The products are useful in preparing polymeric materials.

---

This invention relates to organosilicon compounds and to a process for their preparation.

According to the invention, there are provided organosilicon compounds of the general formula

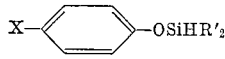

wherein X represents a chlorine atom or bromine atom and each R' represents a monovalent hydrocarbon radical.

In the general formula R' can represent any monovalent hydrocarbon radicals, for example, alkyl radicals such as methyl, ethyl, propyl, butyl, nonyl and octadecyl radicals, alkenyl radicals such as vinyl, allyl and cyclohexenyl radicals and aryl radicals such as phenyl, diphenyl and naphthyl radicals.

The compounds of the invention can be prepared by the reaction of (1) a halogenated phenol of the formula

with (2) a silicon compound containing an $R'_2HSi$ group and having a formula selected from the group consisting of $R'_2HSiY$ and $(R'_2SiH)_2NR'''$ where X is Cl or Br, each R' represents a monovalent hydrocarbon radical, R''' represents hydrogen or an alkyl radical and Y represents a chlorine atom or a radical of the formula —$NR''_2$ in which each R'' represents a hydrogen atom, an alkyl radical or an aryl radical.

The reaction between the halogenated phenol and the organosilicon compound is exothermic and can thus conveniently be effected by mixing the reactants at or about room temperature. If desired, however, the reaction can be performed at temperatures above or below room temperature, for example, from 0° C. to the reflux temperature of the reactants.

Preferably, the reaction is performed in the presence of an inert organic solvent. Hydrocarbon solvents such as toluene, xylene or mixtures thereof with, for example, petroleum ethers are suitable. When the silane reactant is a chlorosilane, the reaction is best performed in the presence of an acceptor for the hydrogen halide generated. Suitable hydrogen halide acceptors will be readily evident to those skilled in the art and include, for example, tertiary amines such as triethylamine, trimethylamine and pyridine. When a hydrogen halide is generated as a by-product during the reaction, the solvent employed is preferably one in which the product of the hydrogen halide and the acceptor therefore is substantially insoluble.

The relative proportions of the halogenated phenol and silane reactants can vary widely, e.g., from .1 to 10 mols of phenol per mol of silane and will depend in part on the nature of the organosilicon reactant. Preferably, stoichiometric or approximately stoichiometric, proportions of the reactants are employed.

The compounds of this invention are useful as intermediates in the preparation of other organosilicon compounds and polymers.

The following examples illustrate the invention which is delineated in the claims and is not limited by the examples.

EXAMPLE 1 p-Chlorophenol (26.7 g. 0.207 mol) was dissolved in dry toluene (100 ml.) and tetramethyldisilazane (14 g. 0.105 mol) was then added. An exothermic reaction took place and after 5 minutes the toluene was removed by fractional distillation to yield a liquid residue of p-chloro-O-dimethylsilylphenol.

EXAMPLE 2 p-Chloro-O-dimethylsilylphenol was obtained when stoichiometric proportions of (1) p-chlorophenol or p-bromophenol and (2) dimethylhydrogenchlorosilane or $(CH_3)_2HSiNHCH_3$ were reacted in dry toluene in accordance with Example 1.

That which is claimed is:

1. Organosilicon compounds of the general formula

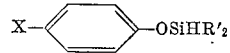

wherein X represents a chlorine atom or bromine atom and each R' represents a monovalent hydrocarbon radical.

2. The compound of the formula

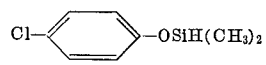

3. A process for the preparation of an organosilicon compound as claimed in claim 1 which comprises reacting (1) a halogenated phenol of the formula

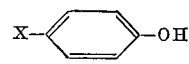

wherein X is Cl or Br, with (2) a compound of the general formula $R'_2HSiY$ or a compound of the general formula $(R'_2SiH)_2NR'''$, wherein R' represents a monovalent hydrocarbon radical, R''' represents a hydrogen atom or an alkyl radical and Y represents a chlorine atom or a radical of the formula —$NR''_2$ in which each R'' represents a hydrogen atom, an alkyl radical or an aryl radical.

4. A process as claimed in claim 3 wherein reactant (2) is a compound of the general formula $R'_2HSiCl$ and the reaction is carried forward in the presence of a hydrogen halide acceptor.

References Cited

UNITED STATES PATENTS

| | | | |
|---|---|---|---|
| 2,611,776 | 9/1952 | Speier | 260—448.8RX |
| 2,611,779 | 9/1952 | Speier | 260—448.8R |
| 2,611,781 | 9/1952 | Speier | 260—448.8R |
| 2,711,417 | 6/1955 | Frisch | 260—448.8R |
| 3,137,720 | 6/1964 | Cooper | 260—448.8RX |
| 3,328,450 | 6/1967 | Plueddemann | 260—448.8R |
| 3,491,137 | 1/1970 | Zaweski et al. | 260—448.8R |

TOBIAS E. LEVOW, Primary Examiner

P. F. SHAVER, Assistant Examiner

U.S. Cl. X.R.

260—46.5